US009082002B2

(12) United States Patent
Tsukizawa et al.

(10) Patent No.: US 9,082,002 B2
(45) Date of Patent: Jul. 14, 2015

(54) DETECTION DEVICE AND DETECTION METHOD (75) Inventors: Sotaro Tsukizawa, Osaka (JP);
Hiroyuki Kubotani, Hyogo (JP);
Zhiheng Niu, Singapore (SG); Sugiri Pranata, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 354 days.

(21) Appl. No.: 13/816,395

(22) PCT Filed: Dec. 20, 2011

(86) PCT No.: PCT/JP2011/007108
§ 371 (c)(1),
(2), (4) Date: Feb. 11, 2013

(87) PCT Pub. No.: WO2012/095927
PCT Pub. Date: Jul. 19, 2012

(65) Prior Publication Data
US 2013/0142416 A1 Jun. 6, 2013

(30) Foreign Application Priority Data
Jan. 13, 2011 (JP) ................................. 2011-004788

(51) Int. Cl.
*G06K 9/00* (2006.01)
*G06K 9/46* (2006.01)
(52) U.S. Cl.
CPC ........ *G06K 9/00255* (2013.01); *G06K 9/00604* (2013.01); *G06K 9/4614* (2013.01)
(58) Field of Classification Search
None
See application file for complete search history.

(56) References Cited

U.S. PATENT DOCUMENTS 5,218,387 A  6/1993  Ueno et al.
7,044,602 B2  5/2006  Chernyak
(Continued)

FOREIGN PATENT DOCUMENTS

CN  1437161 A  8/2003
CN  1650148 A  8/2005
(Continued)

OTHER PUBLICATIONS

Search Report for Chinese Patent Application No. 201180036460.4 dated Jan. 4, 2015.
(Continued)

*Primary Examiner* — Mark Roz
(74) *Attorney, Agent, or Firm* — Pearne & Gordon LLP (57) ABSTRACT A detection device capable of reliably detecting an object to be detected. An intersection region pattern setting unit (106) sets a configuration pattern of a first intersection region pattern group in sequence for each unit image pair. Each intersection region pattern is defined by set image information which denotes locations and sizes of regions (where n is a natural number greater than 1) within respective unit images (e.g., unit image plane coordinates), as well as whether each region is set within either or both of a first unit image and a second unit image. A detection unit (108) detects the object to be detected, based on a total feature value relating to each configuration pattern of the first intersection region pattern group, computed by a feature value computation unit (107), and a strong identification apparatus configured from a plurality of weak identification apparatuses and stored in an identification apparatus storage unit (112).

4 Claims, 8 Drawing Sheets

(56) References Cited

U.S. PATENT DOCUMENTS

| | | |
|---|---|---|
| 7,155,035 B2 | 12/2006 | Kondo et al. |
| 7,206,435 B2 | 4/2007 | Fujimura et al. |
| 7,261,415 B2 | 8/2007 | Chernyak |
| 7,431,457 B2 | 10/2008 | Chernyak |
| 7,835,633 B2 | 11/2010 | Omi |
| 8,619,132 B2 | 12/2013 | Ramstad |
| 8,740,385 B2 | 6/2014 | Chernyak |
| 2003/0152252 A1 | 8/2003 | Kondo et al. |
| 2003/0223037 A1 | 12/2003 | Chernyak |
| 2004/0005083 A1 | 1/2004 | Fujimura et al. |
| 2005/0201591 A1* | 9/2005 | Kiselewich ............ 382/104 |
| 2005/0213796 A1 | 9/2005 | Ikoma et al. |
| 2006/0161141 A1 | 7/2006 | Chernyak |
| 2008/0009840 A1 | 1/2008 | Chernyak |
| 2008/0267600 A1 | 10/2008 | Omi |
| 2009/0012505 A1 | 1/2009 | Chernyak |
| 2009/0238460 A1* | 9/2009 | Funayama et al. ............ 382/181 |
| 2009/0278919 A1 | 11/2009 | Ramstad |
| 2009/0284525 A1 | 11/2009 | Ramstad |
| 2009/0284586 A1 | 11/2009 | Ramstad |
| 2014/0316390 A1 | 10/2014 | Chernyak |

FOREIGN PATENT DOCUMENTS

| | | |
|---|---|---|
| CN | 1667640 A | 9/2005 |
| CN | 1680779 A | 10/2005 |
| CN | 101295355 A | 10/2008 |
| CN | 101641720 A | 2/2010 |
| CN | 101901485 A | 12/2010 |
| JP | 2005-182247 A | 7/2005 |
| JP | 2005-348832 A | 12/2005 |

OTHER PUBLICATIONS

International Search Report for PCT/JP2011/007108 dated Apr. 3, 2012.

Paul Viola and Michael J. Jones, Rapid Object Detection using a Boosted Cascade of Simple Features, IEEE CVPR, 2001.

* cited by examiner

DETECTION DEVICE AND DETECTION METHOD

TECHNICAL FIELD

The present invention relates to a detection apparatus and a detection method, and more particularly, to a detection apparatus and a detection method for detecting an object to be detected by use of stereo images captured by two imaging systems at the same timing.

BACKGROUND ART

When the centers of pupils are detected in line-of-sight detection or expression detection, the red-eye effect may occur due to low illuminance. In a normal pupil detection method, pupils are detected by using a fact that the brightness of a portion corresponding to a pupil is normally lower than the brightness of a region around the portion in an image. However, when the red-eye effect occurs, the brightness of an image region corresponding to a pupil increases. Thus, when the red-eye effect occurs, pupils cannot be stably detected by the pupil detection method targeted at normal pupils.

To solve the problem, in a technique disclosed in Patent Literature 1, pupils are detected by using a plurality of images captured at different timings while positively causing the red-eye effect occur over the entire pupil.

CITATION LIST

Patent Literature

PTL 1
Japanese Patent Application Laid-Open No. 2005-182247

Non-Patent Literature

NPL 1
Paul Viola and Michael J. Jones, "Rapid Object Detection using a Boosted Cascade of Simple Features", IEEE CVPR, 2001

SUMMARY OF INVENTION

Technical Problem

However, in the aforementioned conventional technique, the red-eye effect does not occur over the entire pupil, but occurs only in a portion of the pupil in some cases. In this case, only "a partial region of the pupil" where the red-eye effect occurs can be detected in the aforementioned conventional technique. The position of "a partial region of the pupil" where the red-eye effect occurs largely depends on the line of sight, the positional relationship between an imaging apparatus and a face, or the like. Thus, even if "a partial region of the pupil" where the red-eye effect occurs can be detected, the center position of the pupil is difficult to identify from the detection result.

It is an object of the present invention to provide a detection apparatus and a detection method which can stably detect an object to be detected even when the object to be detected is captured in images differently and in various ways depending on the relative positional relationship between the object to be detected and an imaging apparatus.

Solution to Problem

A detection apparatus reflecting one aspect of the present invention is a detection apparatus for detecting an object to be detected in a first mage and a second image captured by two imaging systems at a same timing, including: an integral image calculation section that calculates a first integral image and a second integral image from the first image and the second image; an acquisition section that acquires a unit image pair composed of a first unit image and a second unit image from the first integral image and the second integral image, wherein a plurality of unit image pairs cut out at different positions from each other are acquired by sequentially shifting the cutout positions of the unit images; a setting section that sets, with respect to each of the unit image pairs, M cross region patterns (M is a natural number not less than 2), each of the M cross region patterns being defined by positions and sizes of N setting regions (N is a natural number not less than 2) within the respective unit images, and setting image information indicating whether the respective setting regions are set within the first unit image or the second unit image; a feature value calculation section that calculates a feature value in each of the image regions where the cross region patterns are set by the setting section, and calculates a total feature value for each of the cross region patterns from the calculated feature values; and a detection section that detects the object to be detected based on the total feature value for each of the M cross region patterns and a strong classifier composed of a plurality of weak classifiers each corresponding to each of the M cross region patterns.

A detection method reflecting one aspect of the present invention is a detection method for detecting an object to be detected in a first image and a second image captured by two imaging systems at a same timing, including: an integral image calculation step of calculating a first integral image and a second integral image from the first image and the second image; an acquisition step of acquiring a unit image pair composed of a first unit image and a second unit image from the first integral image and the second integral image, wherein a plurality of unit image pairs cut out at different positions from each other are acquired by sequentially shifting the cutout positions of the unit images; a setting step of setting, with respect to each of the unit image pairs, M cross region patterns (M is a natural number not less than 2), each of the M cross region patterns being defined by positions and sizes of N setting regions (N is a natural number not less than 2) within the respective unit images, and setting image information indicating whether the respective setting regions are set within the first unit image or the second unit image; a feature value calculation step of calculating a feature value in each of the image regions where the cross region patterns are set in the setting step, and calculating a total feature value for each of the cross region patterns from the calculated feature values; and a detection step of detecting the object to be detected based on the total feature value for each of the M cross region patterns and a strong classifier composed of a plurality of weak classifiers each corresponding to each of the M cross region patterns.

Advantageous Effects of Invention

The present invention can provide a detection apparatus and a detection method which can stably detect an object to be detected even when the object to be detected is captured in images differently and in various ways depending on the relative positional relationship between the object to be detected and an imaging apparatus.

DESCRIPTION OF EMBODIMENTS

In the following, one embodiment of the present invention will be described in detail by reference to the drawings.

[Main Configuration of Detection Apparatus]

Figure 1:
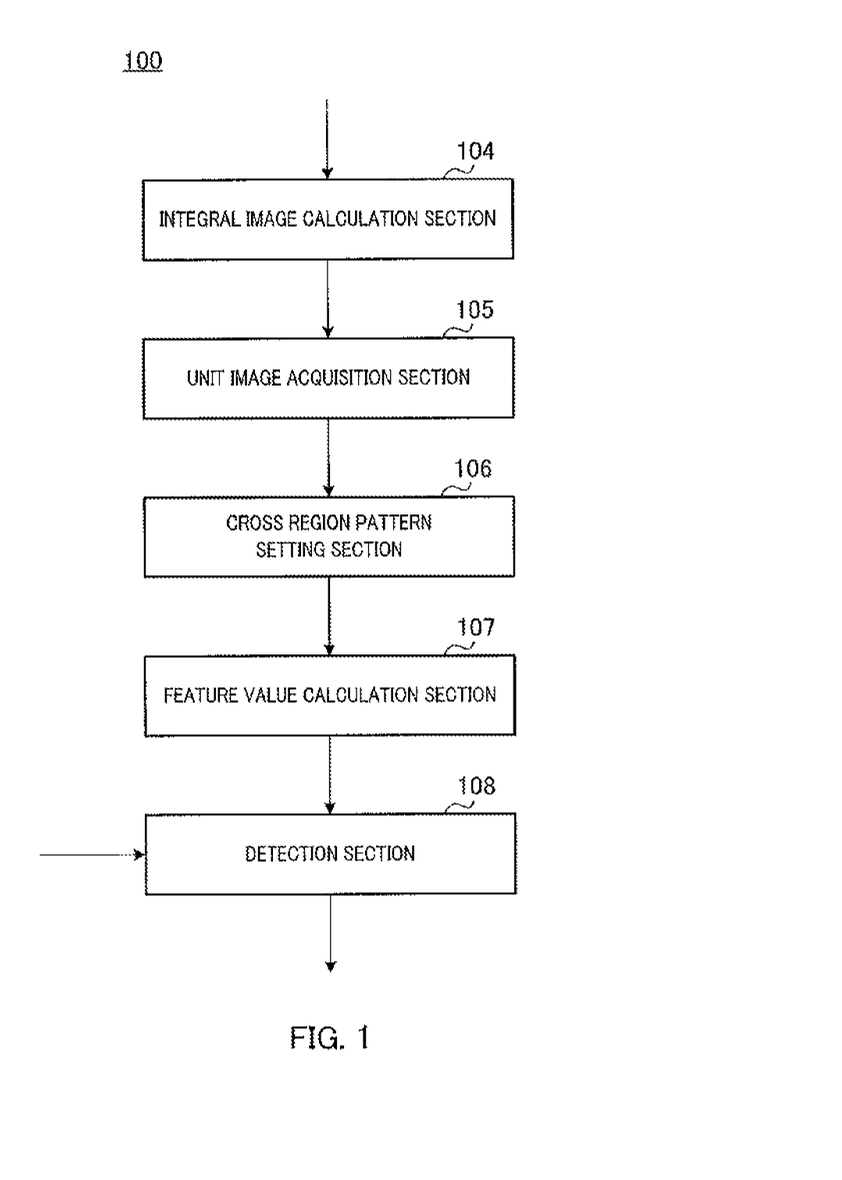
FIG. 1 is a block diagram illustrating the main configuration of a detection apparatus according to one embodiment of the present invention.

FIG. 1 shows the main configuration of detection apparatus 100 according to one embodiment of the present invention. In FIG. 1, detection apparatus 100 includes integral image calculation section 104, unit image acquisition section 105, cross region pattern setting section 106, feature value calculation section 107, and detection section 108.

Integral image calculation section 104 calculates a "first integral image" and a "second integral image" from a first image and a second image as stereo images captured by two imaging systems at the same timing. The "integral image" is a data structure for effectively calculating the sum of pixel values in a given rectangular region. The integral image calculated from the first image captured by a first imaging system is the "first integral image", and the integral image calculated from the second image captured by a second imaging system is the "second integral image".

Unit image acquisition section 105 acquires unit images having a predetermined size from the first integral image and the second integral image. In the following, the unit image acquired from the first integral image is called "first unit image", and the unit image acquired from the second integral image is called "second unit image". That is, unit image acquisition section 105 acquires a "unit image pair" composed of the first unit image and the second unit image respectively from the first integral image and the second integral image.

The first unit image and the second unit image respectively correspond to partial images of the first image and the second image in which the same photographic object is captured. That is, there is parallax between the first imaging system and the second imaging system. Thus, when the same coordinate system is set for the first image and the second image, the coordinates of the first unit image and the coordinates of the second unit image are separated from each other by a distance corresponding to the parallax.

Unit image acquisition section 105 acquires the unit images respectively from the first integral image and the second integral image by sequentially shifting cutout positions of the unit images. Unit image acquisition section 105 can thereby acquire a plurality of unit image pairs cut out at different positions from each other.

Cross region pattern setting section 106 sequentially sets a plurality of "cross region patterns" with respect to each of the unit image pairs. Each of the cross region patterns is defined by the positions (i.e., the coordinates on a unit image plane) and the sizes of N regions (N is a natural number not less than 2) within the respective unit images, and setting image information indicating whether the respective regions are set within the first unit image or the second unit image. The unit image plane coordinates of a region constituting one cross region pattern differ from the unit image plane coordinates of a region constituting another cross region pattern.

Feature value calculation section 107 calculates a feature value in each of the image regions where the cross region patterns are set by cross region pattern setting section 106, and calculates a total feature value for each of the cross region patterns from the calculated feature values.

Detection section 108 detects an object to be detected based on the total feature value for each of the plurality of cross region patterns, and a strong classifier composed of a plurality of weak classifiers each corresponding to each of the plurality of cross region patterns.

In the following, a case in which a human face is a photographic object and the center of a pupil is an object to be detected will be described as an example.

[Specific Configuration of Detection Apparatus 100]

Figure 2:
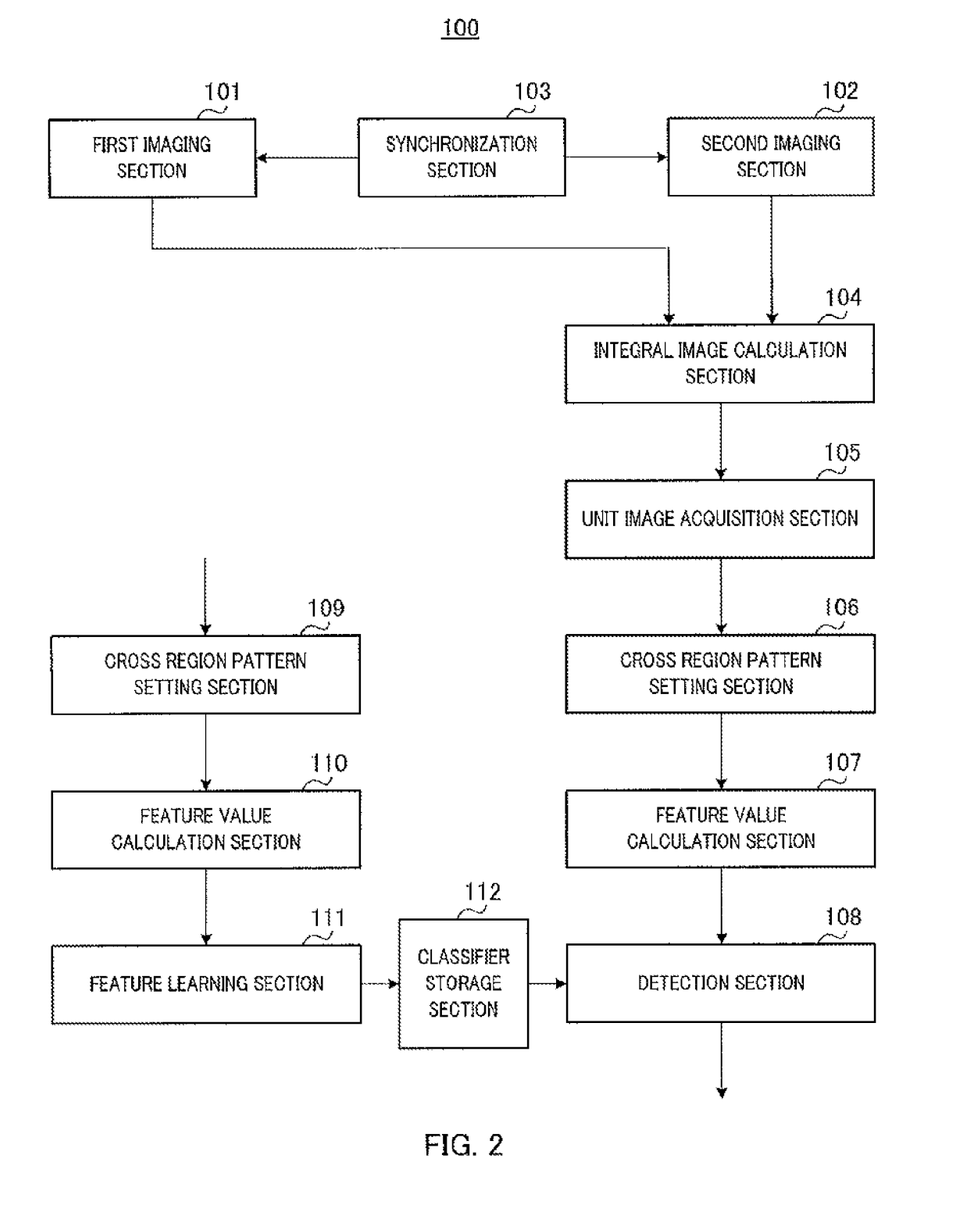
FIG. 2 is a block diagram illustrating the configuration of the detection apparatus according to one embodiment of the present invention.

FIG. 2 shows the configuration of detection apparatus 100 according to one embodiment of the present invention. In FIG. 2, detection apparatus 100 includes first imaging section 101, second imaging section 102, synchronization section 103, integral image calculation section 104, unit image acquisition section 105, cross region pattern setting section 106, feature value calculation section 107, detection section 108, cross region pattern setting section 109, feature value calculation section 110, feature learning section 111, and classifier storage section 112.

First imaging section 101 receives a synchronous signal output from synchronization section 103, and captures a human face at a timing according to the synchronous signal. An image captured by first imaging section 101 (simply referred to as "first image") is output to integral image calculation section 104.

First imaging section 101 is installed at a place, such as on a television, on an automobile steering wheel, and on a dashboard, where the imaging section easily captures a face. First imaging section 101 also includes an image sensor such as CCD (Charge Coupled Devices) and CMOS (Complementary Metal Oxide Semiconductor).

Second imaging section 102 has the same configuration as that of first imaging section 101. That is, second imaging section 102 receives a synchronous signal output from synchronization section 103, and captures the human face at a timing according to the synchronous signal. First imaging section 101 and second imaging section 102 can thereby capture the human face at the same timing.

Second imaging section 102 is installed at a position apart a predetermined distance from first imaging section 101 and where the imaging; section can capture the same photographic object as that of first imaging section 101. An image captured by second imaging section 102 (simply referred to as "second image") is output to integral image calculation section 104. That is, the first image and the second image are images of the same photographic object captured at the same timing from different directions.

In the following, the captured first and second images will be described by setting the image horizontal direction as X axis, the image vertical direction as Y axis, and one pixel as one coordinate point.

Synchronization section 103 outputs the synchronous signals to first imaging section 101 and second imaging section 102. Synchronization section 103 outputs the synchronous signals for a time length equivalent to that from an exposure start to an exposure end, for example. First imaging section 101 and second imaging section 102 can thereby capture an object at the same timing. A trigger signal for the output of the synchronous signals may be manually given to synchronization section 103 by a user, or may be automatically given to synchronization section 103.

First imaging section 101, second imaging section 102, and synchronization section 103 described above are mounted as, for example, a stereo camera, and capture the face at the synchronized timing from different viewpoints. That is, the positional relationship between first imaging section 101 and second imaging section 102 is fixed and does not change in each image capturing operation as described above.

Integral image calculation section 104 calculates an integral image from each of the first image and the second image input thereto. The integral image calculated from the first image is a first integral image, and the integral image calculated from the second image is a second integral image.

Unit image acquisition section 105 acquires a "unit image pair" composed of a first unit image and a second unit image from the first integral image and the second integral image.

Unit image acquisition section 105 acquires, from each of the first integral image and the second integral image, plurality of unit image pairs cut out at different positions from each other, by sequentially shifting the cutout positions of the unit images.

Cross region pattern setting section 106 sequentially sets a plurality of "cross region patterns" with respect to each of the unit image pairs.

To be more specific, cross region pattern setting section 106 holds a first cross region pattern group. The first cross region pattern group is composed of the M cross region patterns (M is a natural number not less than 2). Cross region pattern setting section 106 sequentially sets the constituent patterns with respect to each of the unit image pairs so as to set all the constituent patterns of the first cross region pattern group.

Feature value calculation section 107 calculates a feature value in each of the image regions where the cross region patterns are set by cross region pattern setting section 106, and calculates a total feature value for each of the cross region patterns from the calculated feature values.

Detection section 108 detects an object to be detected based on the total feature value for each of the constituent patterns of the first cross region pattern group, and a strong classifier composed of a plurality of weak classifiers stored in classifier storage section 112. Each of the plurality of weak classifiers constituting the strong classifier corresponds to each of the plurality of cross region patterns constituting the first cross region, pattern group. That is, since the first cross region pattern group is composed of the M cross region patterns (M is a natural number not less than 2), the number of weak classifiers constituting the strong classifier is also M.

A plurality of sample unit image pairs as learning samples are input to cross region pattern setting section 109. The plurality of sample unit image pairs include a positive sample and a negative sample. A sample unit image pair falling into the positive sample is composed of a first unit image and a second unit image calculated from a first image and a second image in which the center of a pupil is captured in the center of the unit image. A sample unit image pair falling into the negative sample is composed of a first unit mage and a second unit image in which the center of a pupil is captured at a position other than the center of the unit image, or a first unit image and a second unit image in which no pupil center is captured. That is, the sample unit image pair falling into the negative sample is composed of unit images corresponding to a portion apart a predetermined distance from the pupil image.

Cross region pattern setting section 109 sequentially sets a plurality of "cross region patterns" with respect to each of the sample unit image pairs. To be more specific, cross region pattern setting section 109 holds a second cross region pattern group. The second cross region pattern group is composed of K cross region patterns (K is a natural number not less than M). Cross region pattern setting section 109 sequentially sets the constituent patterns with respect to each of the sample unit image pairs so as to set all the constituent patterns of the second cross region pattern group.

Feature value calculation section 110 calculates a feature value in each of image regions where the cross region patterns are set by cross region pattern setting section 109, and calculates a total feature value for each of the cross region patterns from the calculated feature values.

Feature learning section 111 generates at least one weak classifier candidate corresponding to each of the K cross region patterns constituting the second cross region pattern group. Here, the weak classifier is expressed as a function which, for example, returns 1 when the feature value is equal to or more than the predetermined threshold value and returns −1 when the feature value is less than the predetermined threshold value. One weak classifier corresponds to one cross region pattern. Thus, each of the weak classifiers is identified by the positions (i.e., the coordinates on a unit image plane) and the sizes of N regions (N is a natural number not less than 2) within the respective unit images, setting image information indicating whether the respective regions are set within the first unit image or the second unit image, and the predetermined threshold value.

Feature learning section 111 extracts (determines) a weak classifier candidate that meets an "extraction standard" based on the total feature value for each of the K cross region patterns, and the weak classifier candidate corresponding to each of the cross region patterns. The accuracy rate in determining whether the weak classifier candidate is the positive sample or the negative sample is used as the "extraction standard". Feature learning section 111 outputs the weak classifier candidate meeting the extraction standard to classifier storage section 112.

Classifier storage section 112 stores the weak classifier candidate output from feature learning section 111 as a weak classifier constituting the strong classifier. In an early stage, classifier storage section 112 stores the weak classifier candidate output from feature learning section 111 as the weak classifier constituting the strong classifier. When the strong classifier has already been stored, classifier storage section 112 overwrites the existing weak classifier, which has already been stored as the weak classifier corresponding to the weak classifier candidate, with the new weak classifier candidate. Here, the strong classifier is expressed as a function which outputs the sum of scores obtained by the plurality of weak classifiers constituting the strong classifier.

[Operation of Detection Apparatus 100]

Figure 3:
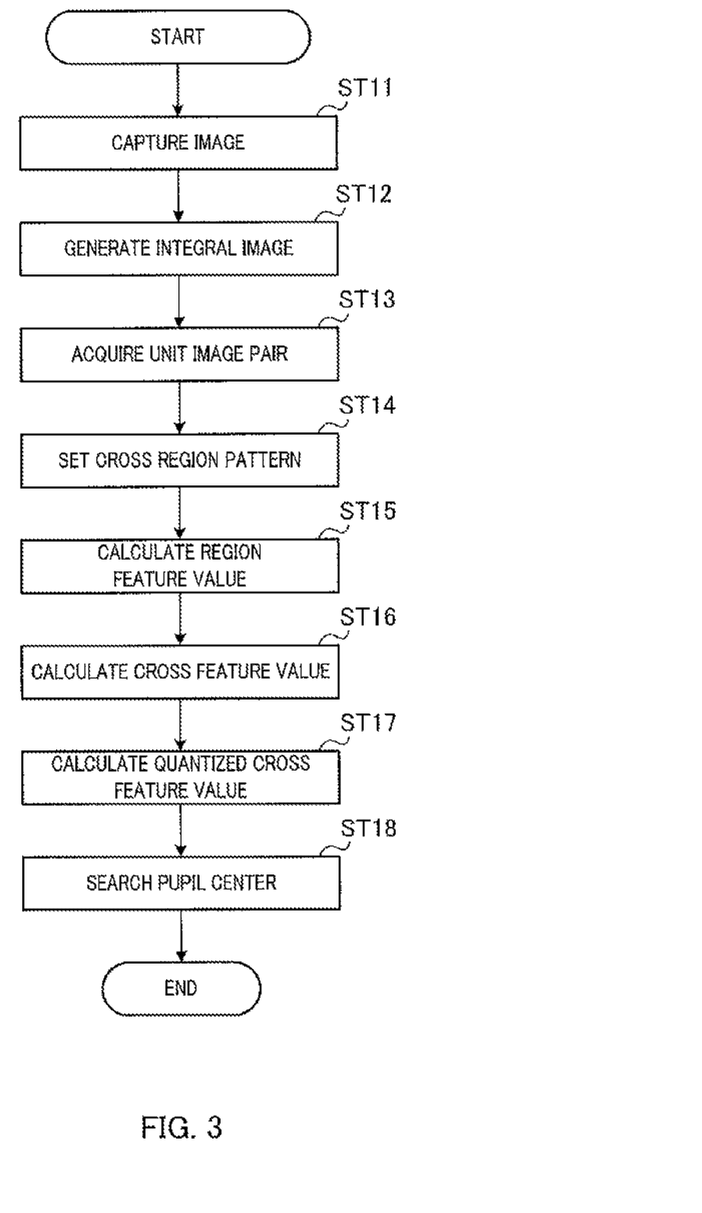
FIG. 3 is a flowchart for explaining a detecting process by the detection apparatus.

The operation of detection apparatus 100 having the above configuration will be described, FIG. 3 is a flowchart for explaining a detecting process by detection apparatus 100. FIG. 4 are image views for explaining various images. The processing flow shown in FIG. 3 starts with the start of an image capturing operation. The image capturing operation may be started by a user, or may be started with a signal from outside or the like as a trigger.

Figure 4A:
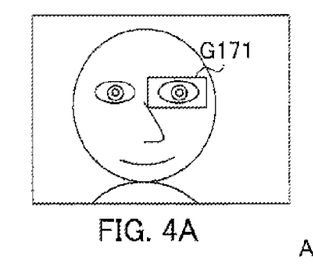
FIGS. 4A-4J are image views for explaining various images.
Figure 4B:
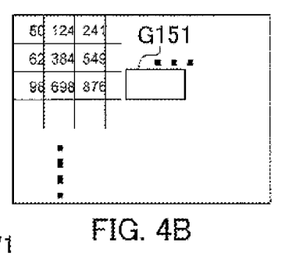
Figures 4C, 4E:
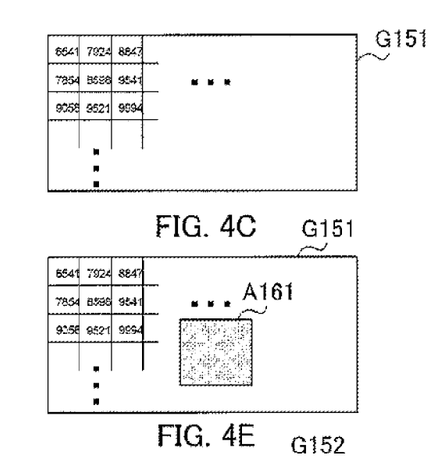
Figure 4D:
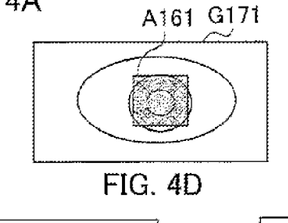
Figures 4F, 4G, 4I:
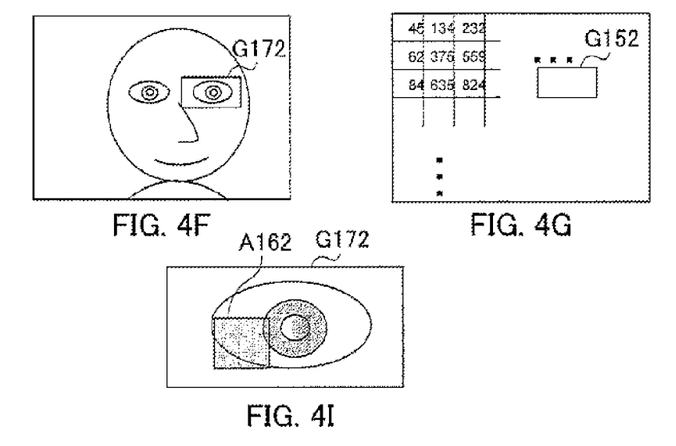

In step ST11, first imaging section 101 and second imaging section 102 operate with synchronization section 103 to capture a face at the same timing from different viewpoints, and thereby acquire the first image and the second image. FIGS. 4A and 4F respectively show the first image and the second image. To be more specific, for example, a digital camera with a CMOS image sensor and a lens may be used as first imaging section 101 and second imaging section 102. PPM (Portable Pix Map file format) images or the like captured in synchronization with a projector are temporarily stored in image storage sections (e.g., a memory space of PC) in first imaging section 101 and second imaging section 102. The temporarily-stored images in the PPM file format are output to integral image calculation section 104.

In step ST12, integral image calculation section 104 generates the integral images respectively from the first image and the second image. The first integral image is calculated from the first image, and the second integral image is calculated from the second image. FIGS. 4B and 4G respectively show the first integral image and the second integral image.

To be more specific, the first integral image and the second integral image are obtained by applying equation 1 to each pixel of the first image and the second image, and setting the calculation result as the value of each pixel.

(Equation 1)

$$ii(x, y) = \sum_{x' < x, y' < y} i(x', y')$$ [1]

Here, a sum D of brightness values of any rectangular shape in the first integral image or the second integral image can be quickly obtained by equation 2.

[2]

$$D = ii(x,y) + ii(i-W,y-L) - ii(x-W,y) - ii(x,y-L)$$ (Equation 2)

In equation 2, D indicates the sum of brightness values of a rectangular shape having a lower right vertex (x, y), a width W, and a height L in an image having a coordinate system with the upper left corner as its origin.

Figures 4H, 4J:
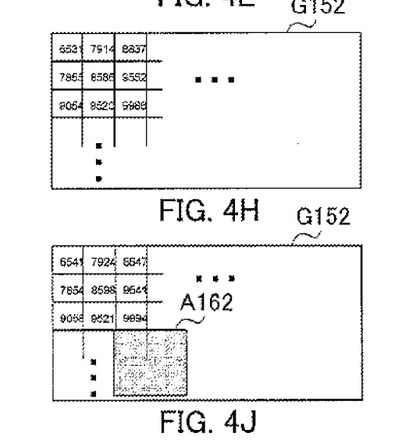

In step ST13, unit image acquisition section 105 acquires the "unit image pair" composed of the first unit image and the second unit image from the first integral image and the second integral image. FIGS. 4C and 4H respectively show the first unit image (G151) and the second unit image (G152), which constitute one unit image pair. Unit image acquisition section 105 acquires, from the first integral image and the second integral image, the plurality of unit image pairs cut out at different positions from each other, by sequentially shifting cutout positions of the unit images.

The first unit image and the second unit image respectively correspond to partial images of the first image and the second image in which the same photographic object is captured. That is, there is parallax between the first imaging system and the second imaging system. When the same coordinate system is set for the first image and the second image, the coordinates of the first unit image and the coordinates of the second unit image are separated from each other by a distance corresponding to the parallax. For example, in the case of a stereo camera, the distance is calculated from the approximate depth of an object by use of a calibration result obtained in advance.

In step ST14, cross region pattern setting section 106 sequentially sets the constituent patterns with respect to each of the unit image pairs so as to set all the constituent patterns of the first cross region pattern group. The first cross region pattern group is composed of the M cross region patterns (M is a natural number not less than 2).

The M cross region patterns (M is a natural number not less than 2) include a cross region pattern, of which all the constituent regions are set in the first unit image, a cross region pattern, of which all the constituent regions are set in the second unit image, and a cross region pattern, of which part of the constituent regions is set in the first unit image and the rest of the constituent regions is set in the second unit image. The respective regions of the cross region pattern preferably have a rectangular shape so as to obtain a speed-up effect by the integral image. However, the regions are not limited to the rectangular shape, and may have a circular shape, a triangular shape, or a closed curve shape. The shapes of the respective regions of the cross region pattern may not be the same as each other. The sizes of the respective regions of the cross region pattern may be the same as or different from each other. FIGS. 4F and 4J show a state in which a cross region pattern composed of region A161 and region A162 is applied to the first unit image and the second unit image. As to the cross region pattern, region A161 is set in the first unit image, and region A162 is set in the second unit image. The respective regions constituting the cross region pattern have a rectangular shape. FIGS. 4D and 4I show a state in which regions A161 and A162 are set in partial images (G171 and G172) of the first image and the second image corresponding to the first unit image and the second unit image for the sake of convenience.

Subsequently, feature value calculation section 107 calculates the feature value in each of the image regions where the cross region patterns are set by cross region pattern setting section 106, and calculates the total feature value for each of the cross region patterns.

To be more specific, the calculated value associated with the total feature value for each of the cross region patterns is obtained through steps ST15 to 17 below.

In step ST15, feature value calculation section 107 calculates the feature value (i.e., region feature value) in each of the image regions where the cross region patterns are set by cross region pattern setting section 106. The region feature value is a value calculated by using the brightness values of pixels in each region. For example, the region feature value is a sum, an average, or a median of the brightness values in the region. Here, the above D is used as the region feature value so as to speed up the processing.

In step ST16, feature value calculation section 107 calculates a cross feature value V for each of the cross region patterns by performing algebra operation by use of the region feature values of each of the cross region patterns calculated in step ST15.

When each of the cross region patterns has two regions) (a region 1 and a region 2) as the constituent regions, and the region feature value of the region 1 is X and the region feature value of the region 2 is Y, the cross feature value V can be obtained, for example, by any of the following equations.

$$V = (X+Y)$$

$$V = (X-Y)$$

$$V = X/Y$$

$$V = (X+Y)/(X-Y)$$

$$V = (X-Y)/(X+Y)$$

In step ST17, feature value calculation section 107 calculates a quantized cross feature value Q as the total feature value by quantizing the cross feature value V. The quantization is an operation to convert the cross feature value as a scalar value to a bin having a value within a predetermined range so as to perform data processing at high speed. The quantization is performed, for example, by the following equation 3.

(Equation 3)

$$Q = (\text{int})\frac{S(V - \min(V))}{\max(V) - \min(V)} \quad [3]$$

In equation 3, S is the number of bins within the predetermined range, max(V) is a maximum value of V, and min(V) is a minimum value of V.

In step ST18, detection section 108 detects the center of a pupil as the object to be detected based on the total feature value for each of the constituent patterns of the first cross region pattern group, and the strong classifier composed of the plurality of weak classifiers stored in classifier storage section 112. The pupil center is searched by applying the strong classifier to each of the unit images by assuming that the center of the unit image is the pupil center. The center of a unit image to which the strong classifier gives a highest score is determined as the pupil center.

Figure 5:
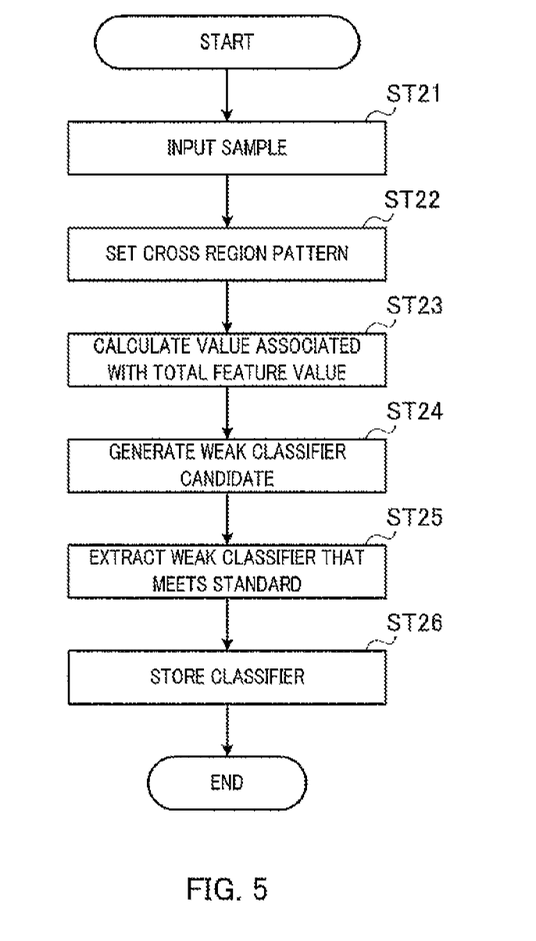
FIG. 5 is a flowchart for explaining a learning process by the detection apparatus.

FIG. 5 is a flowchart for explaining a learning process by detection apparatus 100.

In step ST21, the plurality of sample unit image pairs as learning samples are input to cross region pattern setting section 109.

In step ST22, cross region pattern setting section 109 sequentially sets the constituent patterns with respect to each of the sample unit image pairs so as to set all the constituent patterns of the second cross region pattern group. The second cross region pattern group is composed of K cross region patterns (K is a natural number not less than M).

In step ST23, feature value calculation section 110 calculates the feature value in each of the image regions where the cross region patterns are set by cross region pattern setting section 109, and calculates the total feature value for each of the cross region patterns from the calculated feature values. The processing in step ST23 is the same processing as those of steps ST15 to 17.

In step ST24, feature learning section 111 generates at least one weak classifier candidate corresponding to each of the K cross region patterns constituting the second cross region pattern group.

In step ST25, feature learning section 111 extracts the weak classifier candidate that meets the "extraction standard" based on the total feature value for each of the K cross region patterns and the weak classifier candidate corresponding to each of the cross region patterns.

In step ST26, classifier storage section 112 stores the weak classifier candidate output from feature learning section 111 as the weak classifier constituting the strong classifier.

[Contrast Technique]

Figure 6A:
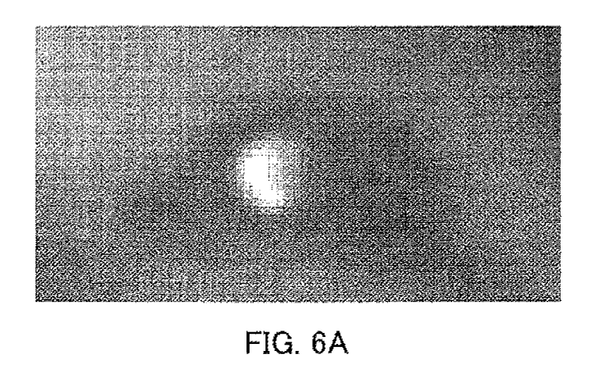
FIGS. 6A-6D show partial images of an image in which a person is captured.
Figure 6B:
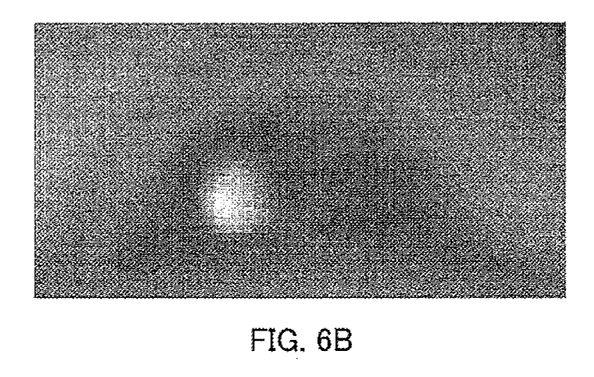
Figure 6C:
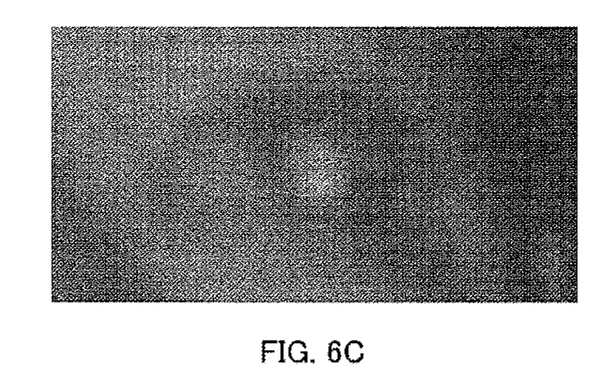
Figure 6D:
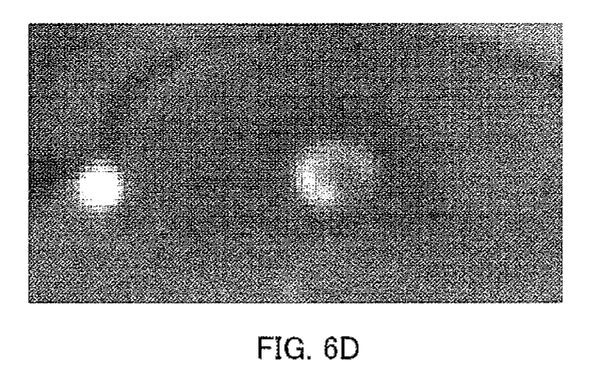

In a case in which a face is illuminated from a close distance of 1 m or less and thereby captured in an image, such a phenomenon that the pupil partially flashes occurs. The phenomenon curs in various nodes depending on the positional relationship between a projector and an imaging apparatus, the head pose, the eyeball direction, or the like. It is thus not easy to estimate the flashing position within the pupil in advance. FIG. 6 show partial images of an image in which a person is captured. FIGS. 6A to 6C are images of the same person captured under the same environment. However, since the head pose or the eyeball direction of the person differs in FIGS. 6A to 6C, the red-eye effect occurs at different positions or with different intensities. In a case in which the person is captured by using a near-infrared image, it is difficult to estimate the pupil center from the iris contour due to little brightness difference between the white and the iris. Moreover, when the red-eye effect unevenly occurs, there is only a small brightness difference between the dark portion and the iris of the pupil in most cases, and the pupil contour is thus difficult to detect. Furthermore, when the person as a photographic object wears glasses as shown in FIG. 6D, circular reflection similar to the red-eye effect may occur due to lens reflection. Since recognition by color phase is impossible in the near-infrared image, the lens reflection is frequently detected as the pupil by mistake.

In a typical pupil detection method, pupils are detected by (1) searching the pupil contour as a circular or oval shape on an image, or (2) performing pattern recognition by learning the image of an eye region. However, when the red-eye effect partially occurs as in the present invention, the method (1) has a problem that the contour is difficult to acquire from the image, and the method (2) has a problem that there are various pupil flashing positions and intensity patterns to frequently cause false detection.

Figure 7:
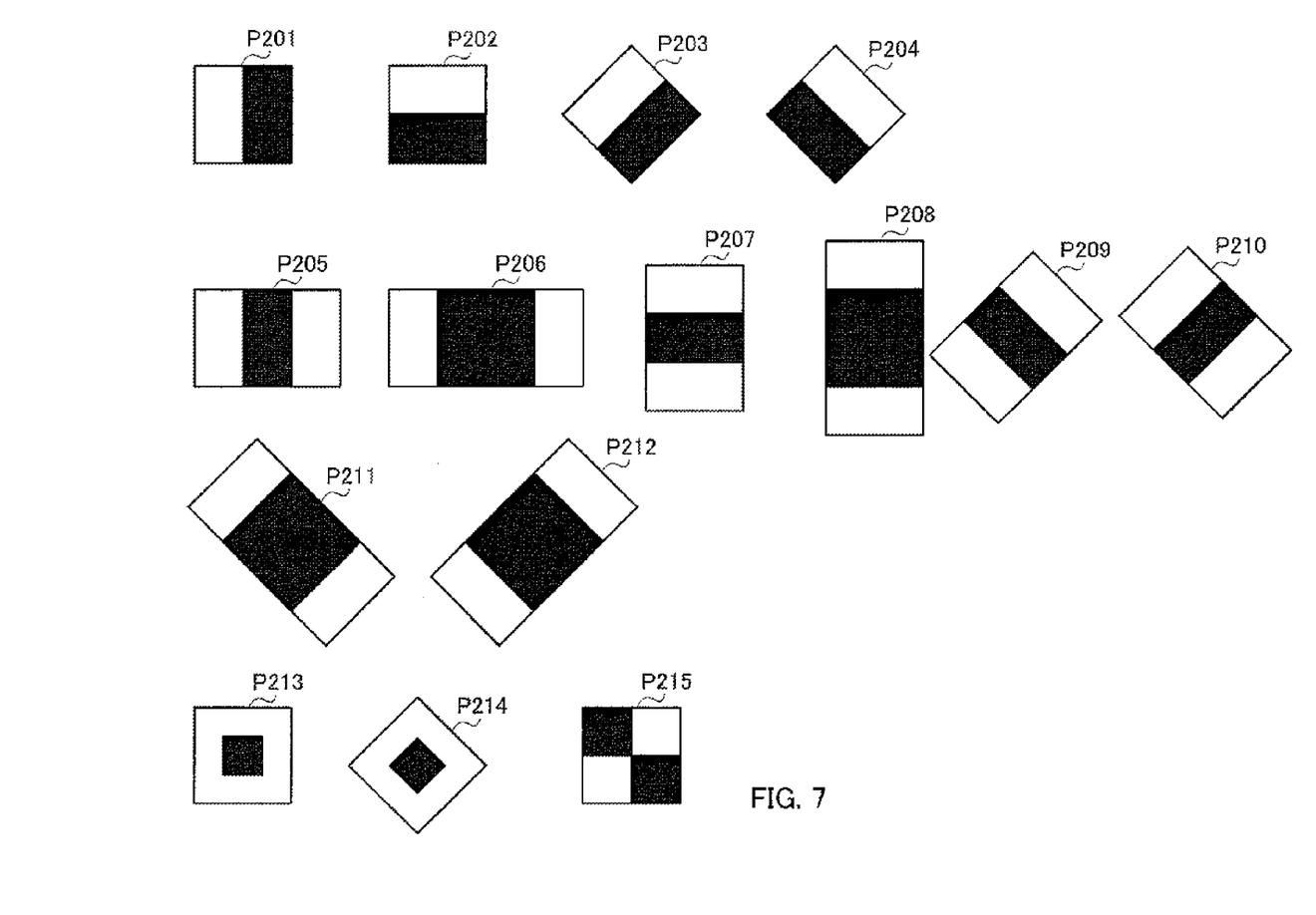
FIG. 7 illustrates an example of a feature used in conventional cases.

In a case in which a feature is extracted from an image captured by a typical imaging apparatus, a combination of adjacent regions within one image is often obtained as the feature as shown in FIG. 7. The feature is not generated between different images. This is because an object often has different positions or poses in different images, and a significant feature is thus difficult to express. Respective features (P201 to P215) in FIG. 7 are expressed as rectangular features composed of a white region and a black region. The features are called Haar-like features e.g. see Non-Patent Literature 1). A value obtained by subtracting the sum of pixel values in the white region from the sum of pixel values in the black region of each of the rectangular features in FIG. 7 is treated as a feature value.

On the other hand, detection apparatus 100 according to the present embodiment employs, as the feature, a difference in appearance between the images captured by the two imaging systems with different viewpoints. Accordingly, even when the red-eye effect partially occurs in the pupil, the pupil and its center, which are difficult to detect in a conventional method, can be detected.

To be more specific, in the present embodiment, the cross region patterns set in the integral images with different constituent regions are used for calculating the feature value. When the feature value calculated as described above is used, even the object to be detected, which appears differently depending on the position of the imaging apparatus, such as the pupil where the red-eye effect occurs, can be reliably detected.

To be more specific, cross region pattern setting section. 106 sequentially sets the plurality of "cross region patterns" with respect to each of the unit image pairs. Feature value calculation section 107 calculates the feature value in each of the image regions where the cross region patterns are set by cross region pattern setting section 106, and calculates the total feature value for each of the cross region patterns from the calculated feature values.

Figure 8:
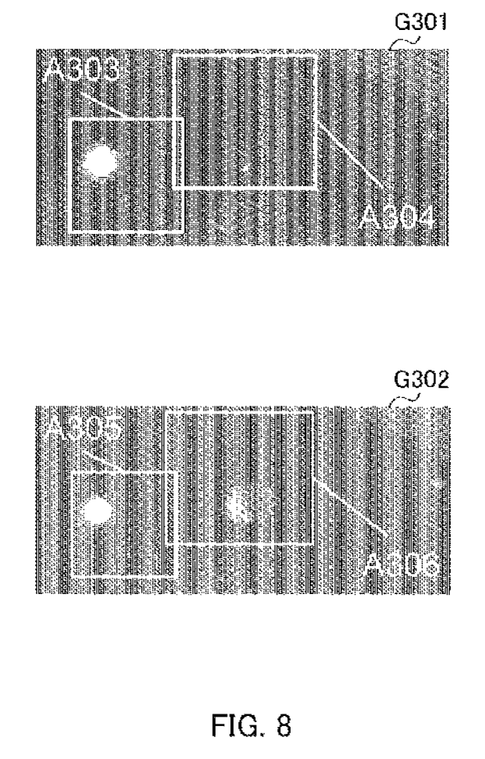
FIG. 8 illustrates images for explaining a cross region pattern.

FIG. 8 illustrates images for explaining the cross region pattern. In FIG. 8, region candidates (A303 to A306) are set in partial images (G301 and (3302) of the first image and the second image corresponding to the first unit image and the second unit image for the sake of convenience.

When the cross region pattern is generated by using the region candidates, six cross region patterns can be generated. A cross region pattern 1 is composed of regions A303 and A304. A cross region pattern 2 is composed of regions A303 and A305. A cross region pattern 3 is composed of regions A303 and A306. A cross region pattern 4 is composed of regions A304 and A305. A cross region pattern 5 is composed of regions A304 and A306. A cross region pattern 6 is composed of regions A305 and A306.

In FIG. 8, the same position on a face is captured in regions A303 and A305, and regions A304 and A306, respectively. However, while the images in region A303 and region A305 appear almost the same, the images in region A304 and region A306 appear differently at a pupil portion. While only one of regions A303 and A304, which are set in the same image, flashes, there are flashing circles, though with different brightness levels, in both regions A305 and A306.

When the feature value is calculated by using the cross region pattern, of which part of the constituent regions is set in in the first unit image and the rest of the constituent regions is set in the second unit image, the feature value can provide information which would not be obtained by the cross region pattern, of which all the constituent regions are set in the same image. In the present embodiment, many feature values based on the cross region patterns as described above are collected and learned. Consequently, the pupil where the red-eye effect occurs can be detected by pattern recognition.

Although the quantized cross feature value Q calculated by feature value calculation section 107 by quantizing the cross feature value V is used in the above description, the present invention is not limited thereto. The cross feature value V may be used as the total feature value.

As described above, in detection apparatus 100 of the present embodiment, unit image acquisition section 105 acquires, from each of the first integral image and the second integral image, the plurality of unit image pairs cut out at different positions from each other, by sequentially shifting the cutout positions of the unit images. Cross region pattern setting section 106 sequentially sets the constituent patterns with respect to each of the unit image pairs so as to set all the constituent patterns of the first cross region pattern group. Each of the cross region patterns is defined by the positions (i.e., the coordinates on the unit image plane) and the sizes N regions (N is a natural number not less than 2) within the respective unit images, and the setting image information indicating whether the respective regions are set within the first unit image or the second unit image. Feature value calculation section 107 calculates the feature value in each of the image regions where the cross region patterns are set by cross region pattern setting section 106, and calculates the total feature value for each of the cross region patterns from the calculated feature values. Detection section 108 detects the object to be detected based on the total feature value for each of the constituent patterns of the first cross region pattern group, and the strong classifier composed of the plurality of weak classifiers stored in classifier storage section 112.

Accordingly, the difference in appearance between the images captured by the two imaging systems with different viewpoints can be employed us the feature. The object to be detected, which is difficult to detect in the conventional method (e.g., the pupil where the red-eye effect partially occurs, and its center), can be thereby detected.

In detection apparatus 100 shown in FIG. 2, a pre-processing section that performs "pre-processing" on the first image and the second image may be provided on the input side of integral image calculation section 104. The "pre-processing" means processing such as smoothing, contrast adjustment, histogram normalization, and denoising on the first image and the second image.

In detection apparatus 100 shown in FIG. 2, cross region pattern setting section 106 and cross region pattern setting section 109 are described as separate functional sections. However, cross region pattern setting section 106 and cross region pattern setting section 109 may be provided as a single functional section. Similarly, feature value calculation section 107 and feature value calculation section 110 may be provided as a single functional section.

The functions of the above respective sections may be achieved by a microcomputer executing a control program. That is, detection apparatus 100 may include CPU as a control section, ROM where a control program is recorded, RAM for program execution, a camera as an imaging apparatus, a projector, and a display section as a display and alarm apparatus, and the control section may control the operation of each section of detection apparatus 100. The respective section in FIG. 2 shows a line-of-sight determining process executed by the control section as blocks.

Detection apparatus 100 may be effectively used as information terminals such as personal computers, office automation equipment, and mobiles, or an information provision apparatus mounted in transportations such as automobiles, airplanes, ships, and trains. Detection apparatus 100 may be also applied to monitoring or alarming apparatuses, robots, or audio/video reproduction apparatuses.

The disclosure of Japanese Patent Application No. 2011-004788, filed on Jan. 13, 2011, including the specification, drawings and abstract, is incorporated herein by reference in its entirety.

INDUSTRIAL APPLICABILITY

The detection apparatus and the detection method according to the present invention can stably detect an object to be detected even when the object to be detected is captured in images differently and in various ways depending on the relative positional relationship between the object to be detected and the imaging apparatus.

REFERENCE SIGNS LIST

100 Detection apparatus
101 First imaging section
102 Second imaging section
103 Synchronization section
104 Integral image calculation section
105 Unit image acquisition section
106, 109 Cross region pattern setting section
107, 110 Feature value calculation section
108 Detection section
111 Feature learning section
112 Classifier storage section

The invention claimed is:

1. A detection apparatus for detecting an object to be detected in a first image and a second image captured by two imaging systems at a same timing, comprising the following sections, each implemented by a processor:

an integral image calculation section that calculates a first integral image and a second integral image from the first image and the second image;

an acquisition section that acquires a unit image pair composed of a first unit image and a second unit image, from the first integral image and the second integral image, wherein a plurality of unit image pairs cut out at different positions from each other are acquired by sequentially shifting the cutout positions of the unit images;

a setting section that sets, with respect to each of the unit image pairs, M cross region patterns (M is a natural number not less than 2), each of the M cross region patterns being defined by positions and sizes of N setting regions (N is a natural number not less than 2) within the respective unit images, and setting image information indicating whether the respective setting regions are set within the first unit image or the second unit image;

a feature value calculation section that calculates a first feature value X and a second feature value Y in each of the image regions where the cross region patterns are set by the setting section, said feature value calculation section including equations:

$V=(X+Y)$, $V=(X-Y)$, $V=X/Y$, $V=(X+Y)/(X-Y)$, and $V=(X-Y)/(X+Y)$; and calculating a total feature value V for each of the cross region patterns from the calculated first feature value X and second feature value Y by using one of the included equations; and a detection section that detects the object to be detected based on the total feature value V for each of the M cross region patterns and a strong classifier composed of a plurality of weak classifiers each corresponding to each of the M cross region patterns.

2. The detection apparatus according to claim 1, wherein the setting section sets a cross region pattern group composed of K cross region patterns (K is a natural number not less than M) with respect to each of a plurality of sample unit image pairs input thereto, the feature value calculation section calculates a feature value in each of image regions where the cross region patterns constituting the cross region pattern group are set by the setting section, and calculates a total feature value for each of the cross region patterns from the calculated feature values, and the detection apparatus further comprises a determination section that determines the weak classifier based on the total feature value for each of the K cross region patterns, and a weak classifier candidate corresponding to each of the cross region patterns constituting the cross region pattern group.

3. The detection apparatus according to claim 1, wherein the feature value calculation section performs algebra operation by use of the calculated feature values to calculate the total feature value.

4. A detection method for detecting an object to be detected in a first image and a second image captured by two imaging systems at a same timing, comprising:

an integral image calculation step of calculating a first integral image and a second integral image from the first image and the second image;

an acquisition step of acquiring a unit image pair composed of a first unit image and a second unit image from the first integral image and the second integral image, wherein a plurality of unit image pairs cut out at different positions from each other are acquired by sequentially shifting the cutout positions of the unit images;

a setting step of setting, with respect to each of the unit image pairs, M cross region patterns (M is a natural number not less than 2), each of the M cross region patterns being defined by positions and sizes of N setting regions (N is a natural number not less than 2) within the respective unit images, and setting image information indicating whether the respective setting regions are set within the first unit image or the second unit image;

a feature value calculation step of calculating a first feature value X and a second feature value Y in each of the image regions where the cross region patterns are set in the setting step, said feature value calculation step including equations:

$V=(X+Y)$, $V=(X-Y)$, $V=X/Y$, $V=(X+Y)/(X-Y)$, and $V=(X-Y)/(X+Y)$ and calculating a total feature value V for each of the cross region patterns from the calculated first feature X and second feature value Y using one of the included equations; and a detection step of detecting the object to be detected based on the total feature value V for each of the M cross region patterns and a strong classifier composed of a plurality of weak classifiers each corresponding to each of the M cross region patterns.

* * * * *